(12) United States Patent
Schmidt

(10) Patent No.: US 10,278,214 B2
(45) Date of Patent: Apr. 30, 2019

(54) SYSTEMS AND METHODS FOR DETECTING NODES OR SIGNALS OF A RADIO ACCESS TECHNOLOGY (RAT) BY A NODE OF ANOTHER RAT

(71) Applicant: Telefonaktiebolaget LM Ericsson (publ), Stockholm (SE)

(72) Inventor: Alfred Schmidt, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 115 days.

(21) Appl. No.: 14/763,206

(22) PCT Filed: Jul. 15, 2015

(86) PCT No.: PCT/IB2015/055364
§ 371 (c)(1),
(2) Date: Jul. 24, 2015

(87) PCT Pub. No.: WO2016/198925
PCT Pub. Date: Dec. 15, 2016

(65) Prior Publication Data
US 2017/0142752 A1 May 18, 2017

Related U.S. Application Data

(60) Provisional application No. 62/174,928, filed on Jun. 12, 2015.

(51) Int. Cl.
| | |
|---|---|
| *H04L 5/00* | (2006.01) |
| *H04J 11/00* | (2006.01) |
| *H04L 25/00* | (2006.01) |
| *H04L 25/03* | (2006.01) |
| *H04L 27/26* | (2006.01) |

(Continued)

(52) U.S. Cl.
CPC ......... *H04W 74/085* (2013.01); *H04L 5/0007* (2013.01); *H04L 25/00* (2013.01);
(Continued)

(58) Field of Classification Search
CPC .. H04W 16/14; H04W 24/02; H04L 27/0006; G06F 9/545; G06F 17/141; G06F 17/15
See application file for complete search history.

(56) References Cited

U.S. PATENT DOCUMENTS

| | | | |
|---|---|---|---|
| 9,608,678 B1 * | 3/2017 | Sun .......................... H04B 1/10 |
| 2005/0117530 A1 | 6/2005 | Abraham et al. | |

(Continued)

FOREIGN PATENT DOCUMENTS

| | | |
|---|---|---|
| GB | 2512394 A | 10/2014 |
| WO | 2014081421 A1 | 5/2014 |

OTHER PUBLICATIONS

International Search Report and Written Opinion for International Patent Application No. PCT/IB2015/055364, dated Apr. 25, 2016, 23 pages.

(Continued)

*Primary Examiner* — Jung H Park
(74) *Attorney, Agent, or Firm* — Withrow & Terranova, PLLC

(57) ABSTRACT

Embodiments of systems and methods enabling a node of a first Radio Access Technology (RAT) to detect (co-channel) frames and/or Access Points (APs)/nodes of a second RAT using receiver hardware of the first RAT are disclosed. While not being limited thereto, in some embodiments, the first RAT is Long Term Evolution (LTE) and the second RAT is Wi-Fi, and systems and methods are disclosed that enable a LTE node (e.g., an LTE Radio Access Network (RAN) node such as a base station or a low power node operating in an unlicensed frequency band) to detect Wi-Fi preambles and/or Wi-Fi beacons (and thus the number of co-channel Wi-Fi APs).

26 Claims, 16 Drawing Sheets

(51) Int. Cl.
*H04W 16/14* (2009.01)
*H04W 72/04* (2009.01)
*H04W 74/08* (2009.01)
*H04W 84/12* (2009.01)
*H04W 88/06* (2009.01)

(52) U.S. Cl.
CPC .. *H04L 25/03012* (2013.01); *H04L 25/03159* (2013.01); *H04L 27/2636* (2013.01); *H04W 72/044* (2013.01); *H04J 11/0093* (2013.01); *H04W 16/14* (2013.01); *H04W 84/12* (2013.01); *H04W 88/06* (2013.01); *Y02D 70/00* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/21* (2018.01)

(56) References Cited

U.S. PATENT DOCUMENTS

| | | |
|---|---|---|
| 2005/0124335 A1 | 6/2005 | Cave et al. |
| 2012/0051407 A1* | 3/2012 | Ji .................... H03H 17/0642 375/219 |
| 2014/0254402 A1 | 9/2014 | Aldana |
| 2015/0105067 A1 | 4/2015 | Valliappan et al. |
| 2016/0095110 A1* | 3/2016 | Li ...................... H04W 72/1215 370/329 |
| 2016/0248555 A1* | 8/2016 | Lei ....................... H04L 5/0005 |
| 2017/0215081 A1* | 7/2017 | Yi ........................ H04W 16/14 |

OTHER PUBLICATIONS

Author Unknown, "Part 11: Wireless LAN Medium Access Control (MAC) and Physical Layer (PHY) Specifications," IEEE Standard 802.11, Mar. 29, 2012, New York, New York, IEEE Computer Society, 2,793 pages.

Invitation to Pay Additional Fees for International Patent Application No. PCT/IB2015/055364, dated Feb. 5, 2016, 7 pages.

Written Opinion for International Patent Application No. PCT/IB2015/055364, dated May 3, 2017, 7 pages.

International Preliminary Report on Patentability for International Patent Application No. PCT/IB2015/055364, dated Jul. 26, 2017, 8 pages.

\* cited by examiner

CONTROL REGION

▨ REFERENCE SYMBOLS  ▨ CONTROL SIGNALING

SYSTEMS AND METHODS FOR DETECTING NODES OR SIGNALS OF A RADIO ACCESS TECHNOLOGY (RAT) BY A NODE OF ANOTHER RAT

RELATED APPLICATIONS

This application is a 35 U.S.C. § 371 national phase filing of International Application No. PCT/IB2015/055364, filed Jul. 15, 2015, which claims the benefit of provisional patent application Ser. No. 62/174,928, filed Jun. 12, 2015, the disclosures of which are hereby incorporated herein by reference in their entireties.

TECHNICAL FIELD

The present disclosure relates to detection of nodes or signals of one Radio Access Technology (RAT) (e.g., Wi-Fi beacons) by a node of another RAT (e.g., Long Term Evolution (LTE)) and, in some particular embodiments, relates to detection of Wi-Fi beacons by a Long Term Evolution in Unlicensed Spectrum (LTE-U) or License Assisted Access Long Term Evolution (LAA-LTE) enhanced or evolved Node B (eNB) without decoding the Wi-Fi protocol.

BACKGROUND

The Third Generation Partnership Project (3GPP) initiative "License Assisted Long Term Evolution (LTE)" (LAA-LTE) aims to allow LTE equipment to operate in the unlicensed 5 Gigahertz (GHz) radio spectrum. The unlicensed 5 GHz spectrum is used as an extension to the licensed spectrum. Accordingly, devices connect in the licensed spectrum (Primary Cell (PCell)) and use Carrier Aggregation (CA) to benefit from additional transmission capacity in the unlicensed spectrum (Secondary Cell (SCell)). To reduce the changes required for aggregating licensed and unlicensed spectrum, the LTE frame timing in the PCell is simultaneously repeated in the SCell.

Today, the unlicensed 5 GHz spectrum is used by equipment implementing the IEEE 802.11 Wireless Local Area Network (WLAN) standard. This standard is known under its marketing brand "Wi-Fi."

LTE Overview

LTE uses Orthogonal Frequency Division Multiplexing (OFDM) in the downlink and Discrete Fourier Transform (DFT) spread OFDM in the uplink. The basic LTE downlink physical resource can thus be seen as a time-frequency grid as illustrated in FIG. 1, where each resource element corresponds to one OFDM subcarrier during one OFDM symbol interval.

As illustrated in FIG. 2, in the time domain, LTE downlink transmissions are organized into radio frames of 10 milliseconds (ms), each radio frame consisting of ten equally-sized subframes of length $T_{subframe}=1$ ms. For normal cyclic prefix, one subframe consists of 14 OFDM symbols. The duration of each OFDM symbol is approximately 71.4 microseconds (μs).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled; that is, in each subframe, the base station transmits control information about which terminals' data are being transmitted and upon which resource blocks the data are being transmitted, in the current downlink subframe. This control signaling is typically transmitted in the first 1, 2, 3, or 4 OFDM symbols in each subframe and the number n=1, 2, 3, or 4 is known as the Control Format Indicator (CFI). The downlink subframe also contains common reference symbols, which are known to the receiver and used for coherent demodulation of, e.g., the control information. A downlink system with CFI=3 OFDM symbols as control is illustrated in FIG. 3.

From LTE Release 11 onwards, the above described resource assignments can also be scheduled on the enhanced Physical Downlink Control Channel (EPDCCH). For LTE Release 8 to Release 10, only the Physical Downlink Control Channel (PDCCH) is available.

The reference symbols shown in FIG. 3 are the Cell specific Reference Symbols (CRSs) and are used to support multiple functions including fine time and frequency synchronization and channel estimation for certain transmission modes.

Carrier Aggregation

The LTE Release 10 standard (and subsequent releases) supports bandwidths larger than 20 Megahertz (MHz). One important requirement on LTE Release 10 is to assure backward compatibility with LTE Release 8. This should also include spectrum compatibility. That would imply that an LTE Release 10 carrier that is wider than 20 MHz should appear as a number of LTE carriers to an LTE Release 8 terminal. Each such carrier can be referred to as a Component Carrier (CC). In particular, for early LTE Release 10 deployments, it can be expected that there will be a smaller number of LTE Release 10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Release 10 carrier. The straightforward way to obtain this would be by means of CA. CA implies that an LTE Release 10 terminal can receive multiple CCs, where the CCs have, or at least have the possibility to have, the same structure as a LTE Release 8 carrier. CA is illustrated in FIG. 4.

The number of aggregated CCs as well as the bandwidth of the individual CCs may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal. A terminal may, for example, support more downlink CCs than uplink CCs, even though the cell is configured with the same number of uplink and downlink CCs.

WLAN

In typical deployments of a WLAN, Carrier Sense Multiple Access with Collision Avoidance (CSMA/CA) is used. This means that the channel is sensed, and only if the channel is declared as Idle, a transmission is initiated. In case the channel is declared as Busy, the transmission is essentially deferred until the channel is found Idle. When the range of several Access Points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded.

A general illustration of how 802.11 stations perform CSMA/CA channel access is shown in FIG. 5. IEEE 802.11 defines a Distributed Coordination Function (DCF). The DCF coordinates the use of the medium through use of CSMA/CA and timing intervals. These timing intervals are slot time, Short Inter-Frame Space (SIFS), Distributed Inter-Frame Space (DIFS), and Extended Inter-Frame Space (EIFS). SIFS and slot time are the shortest intervals and the foundation of the others.

Licensed Assisted Access (LAA) to Unlicensed Spectrum Using LTE

Up to now, the spectrum used by LTE is dedicated to LTE. This has the advantage that the LTE system does not need to care about the coexistence issue and the spectrum efficiency can be maximized. However, the spectrum allocated to LTE is limited and, therefore, cannot meet the ever increasing demand for larger throughput from applications/services. Therefore, discussions are ongoing in 3GPP to initiate a new study item on extending LTE to exploit unlicensed spectrum in addition to licensed spectrum. Unlicensed spectrum can, by definition, be simultaneously used by multiple different technologies. Therefore, when using unlicensed spectrum, LTE would need to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to defer essential control signals and channels on a licensed carrier. That is, as shown in FIG. 6, a User Equipment device (UE) is connected to a PCell in the licensed band and one or more SCells in the unlicensed band. In the present disclosure, a SCell in an unlicensed spectrum is referred to as a License Assisted (LA) SCell.

Efforts are currently underway to specify and implement Long Term Evolution in Unlicensed Spectrum (LTE-U) and License Assisted Access Long Term Evolution (LAA-LTE) protocols that use LTE type protocol in unlicensed frequency channels that are more commonly used by Wi-Fi devices today. To promote co-existence of LTE-U and LAA-LTE with Wi-Fi, it would be desirable for the LTE-U/LAA-LTE enhanced or evolved Node B (eNB) to select a channel that will experience the least contention and interference with Wi-Fi APs and Stations (STAs). There is a need for systems and methods for doing so without the cost of including a full Wi-Fi receiver in the eNB.

SUMMARY

Embodiments of systems and methods enabling a node of a first Radio Access Technology (RAT) to detect (co-channel) frames and/or Access Points (APs)/nodes of a second RAT using receiver hardware of the first RAT are disclosed. While not being limited thereto, in some embodiments, the first RAT is Long Term Evolution (LTE) and the second RAT is Wi-Fi, and systems and methods are disclosed that enable a LTE node (e.g., an LTE Radio Access Network (RAN) node such as a base station or a low power node operating in an unlicensed frequency band) to detect Wi-Fi preambles and/or Wi-Fi beacons (and thus the number of co-channel Wi-Fi APs).

In some embodiments, a method of operation of a node of the first RAT comprises performing matched filtering of a received signal based on a known, repetitive (e.g., periodically transmitted) waveform transmitted by access nodes (e.g., APs) of the second RAT, but sampled at a sampling rate used for the first RAT. In some embodiments, the matched filtering is time domain matched filtering. In other embodiments, the matched filtering is frequency domain matched filtering, and the frequency domain matched filtering uses a Fast Fourier Transform (FFT) of the known, repetitive waveform but with the sampling rate of the first RAT and an FFT (e.g., FFT size) of the first RAT. The method of operation of the node further includes detecting a transmission of the waveform by an AP/node of the second RAT based on results of the matched filtering.

In some embodiments, the first RAT is LTE, the second RAT is Wi-Fi, and the known, repetitive waveform is a Wi-Fi Legacy Short Training Field (L-STF). In this manner, Wi-Fi preambles can be detected.

In some embodiments, a method of operation of a node of the first RAT comprises detecting beacons transmitted by APs/nodes of the second RAT, thereby detecting a number of co-channel APs/nodes. This detection may be based on detection of, e.g., preambles transmitted by the APs/nodes or energy.

In some embodiments, a method of operation of a radio access node of a first RAT comprises dividing a beacon interval for a second RAT into N time bins; detecting, for each of the N time bins for each of M consecutive beacon intervals, transmissions of a known, repetitive waveform by access nodes of the second RAT or received energy; and determining a number of beacons transmitted by access nodes of the second RAT based on results of detecting, for each of the N time bins for each of the M consecutive beacon intervals, transmissions by an access node of the second RAT or received energy.

In some embodiments, the first RAT is LTE and the second RAT is Wi-Fi. Further, in some embodiments, detecting transmissions of a known, repetitive waveform by access nodes of the second RAT or received energy comprises detecting transmissions of Wi-Fi preambles by access nodes of the second RAT for each of the N time bins for each of the M consecutive beacon intervals. Further, in some embodiments, the known, repetitive waveform is an L-STF waveform, and detecting transmissions of the known, repetitive waveform comprises detecting Wi-Fi preambles based on detection of the L-STF waveform.

In some embodiments, detecting, for each of the N time bins for each of the M consecutive beacon intervals, transmissions of the known, repetitive waveform by access nodes of the second RAT or received energy comprises performing matched filtering of a received signal based on the known, repetitive waveform, but sampled at a sampling rate used for the first RAT. In some embodiments, performing matched filtering of the received signal comprises performing time domain matched filtering of the received signal with a filter impulse response that matches the known, repetitive waveform but sampled at the sampling rate used for the first RAT. In some embodiments, performing matched filtering comprises performing frequency domain matched filtering of the received signal. In some embodiments, performing frequency domain matched filtering of the received signal comprises performing frequency domain matched filtering of the received signal with a FFT of the known, repetitive waveform but with the sampling rate used for the first RAT and a FFT size used for the first RAT.

In some embodiments, determining the number of beacons transmitted by access nodes of the second RAT comprises determining an average number of detected Wi-Fi preambles for each of the N time bins over the M consecutive beacon intervals, and determining the number of beacons transmitted by access nodes of the second RAT based on the average number of detected Wi-Fi preambles for each of the N time bins over the M consecutive beacon intervals.

In some embodiments, determining the number of beacons transmitted by access nodes of the second RAT comprises determining a predefined x-th percentile number of detected Wi-Fi preambles for each of the N time bins over the M consecutive beacon intervals, and determining the number of beacons transmitted by access nodes of the second RAT based on the predefined x-th percentile number of detected Wi-Fi preambles for each of the N time bins over the M consecutive beacon intervals.

In some embodiments, detecting transmissions of a known, repetitive waveform by access nodes of the second RAT or received energy comprises detecting received energy for each of the N time bins for each of the M consecutive beacon intervals. In some embodiments, determining the number of beacons transmitted by access nodes of the second RAT comprises accumulating energy for each of the N time bins over the M consecutive beacon intervals and determining the number of detected beacons transmitted by access nodes of the second RAT based on the accumulated energy for each of the N time bins over the M consecutive beacon intervals.

In some embodiments, detecting transmissions of a known, repetitive waveform by access nodes of the second RAT or received energy comprises detecting a maximum energy at an output of a matched filter for each of the N time bins for each of the M consecutive beacon intervals, the matched filter performing matched filtering of a received signal based on the known, repetitive waveform, but sampled at a sampling rate used for the first RAT. In some embodiments, determining the number of beacons transmitted by access nodes of the second RAT comprises accumulating the detected maximum energy for each of the N time bins over the M consecutive beacon intervals, and determining the number of detected beacons transmitted by access nodes of the second RAT based on the accumulated detected maximum energy for each of the N time bins over the M consecutive beacon intervals.

In some embodiments, determining the number of beacons transmitted by access nodes of the second RAT based on results of the detecting comprises, for each time bin of the N time bins, setting the number of preambles detected for the time bin to a number of preambles detected for the time bin that are correlated across the M consecutive beacon intervals to at least a predefined correlation threshold level. In some embodiments, the number of preambles detected for the time bin that are correlated across the M consecutive beacon intervals to at least the predefined correlation threshold level is the number of preambles detected for the time bin that are correlated across the M consecutive beacon intervals to at least to the predefined threshold correlation level with respect to at least one of a group consisting of: start time, duration, and received signal strength. Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments of systems and methods for estimating the number of co-channel Wi-Fi beacons on a candidate unlicensed channel using Long Term Evolution (LTE) receiver hardware are disclosed. Embodiments for detecting Wi-Fi preambles using LTE receiver hardware are also disclosed. Notably, while the discussion herein focuses on LTE and Wi-Fi, the present disclosure is not limited thereto. More generally, concepts disclosed herein can be extended to other types of Radio Access Technologies (RATs). For example, the first RAT that does the detection may be, e.g., LTE, WiMAX, Wi-Fi, or the like, and the second RAT may be, e.g., Wi-Fi, Bluetooth, Zigbee, cordless phone technologies, or the like. As such, the present disclosure provides systems and methods implemented in a network node for a first RAT (e.g., LTE) to detect the number of co-channel Access Points (APs) of a second RAT (e.g., Wi-Fi) using receiver hardware for the first RAT.

Figure 1:
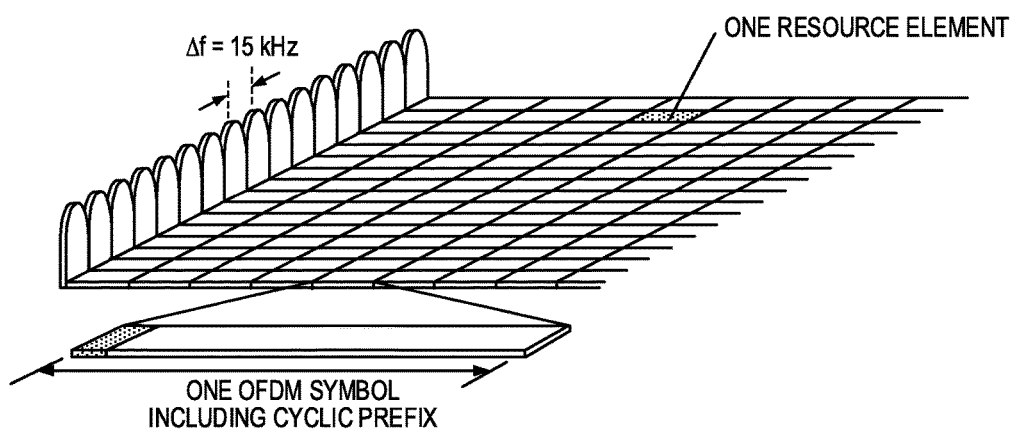
FIG. 1 illustrates the basic Long Term Evolution (LTE) downlink physical resource.
Figure 2:
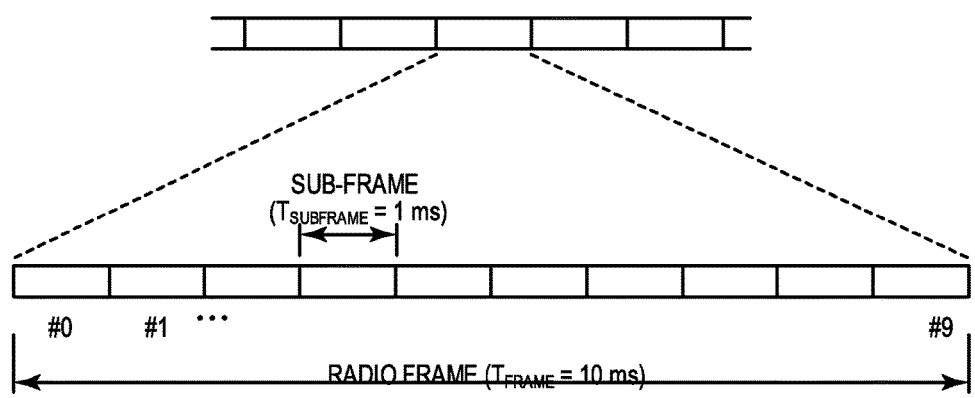
FIG. 2 illustrates the LTE downlink frame structure.
Figure 3:
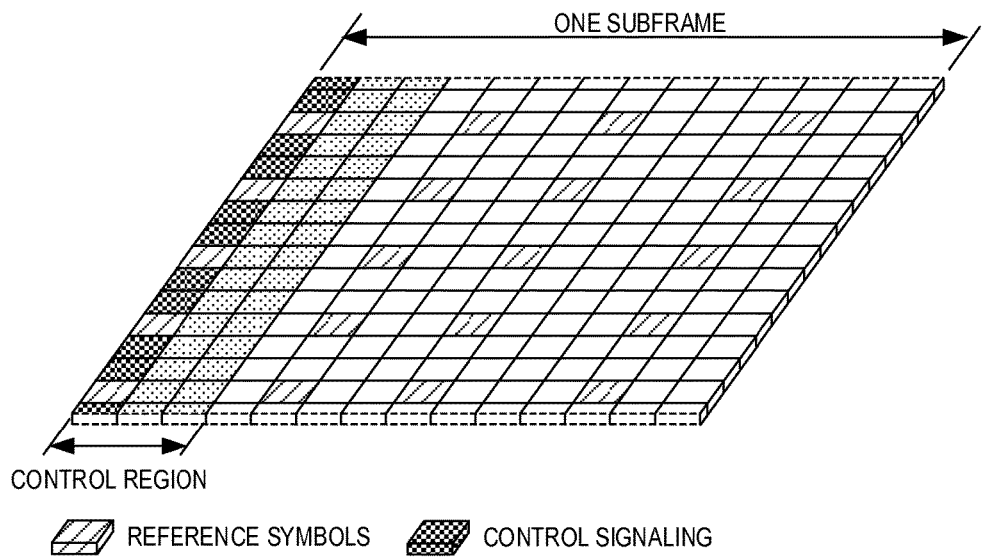
FIG. 3 illustrates a LTE downlink subframe with a Control Format Indicator (CFI) of 3.
Figure 4:
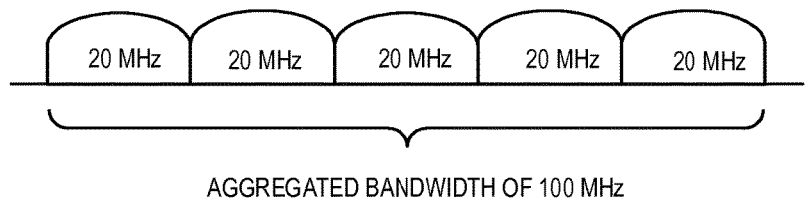
FIG. 4 illustrates Carrier Aggregation (CA)
Figure 5:
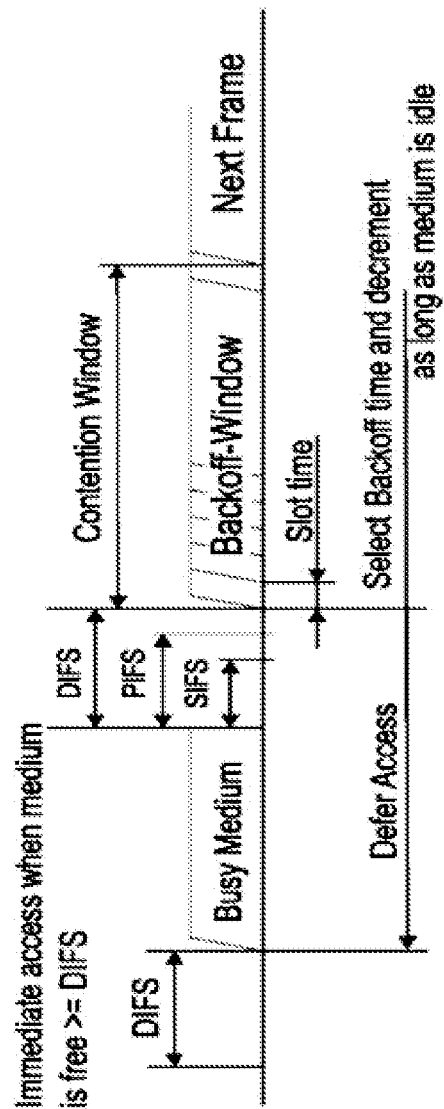
FIG. 5 is a general illustration of a Listen-Before-Talk (LBT) mechanism.
Figure 6:
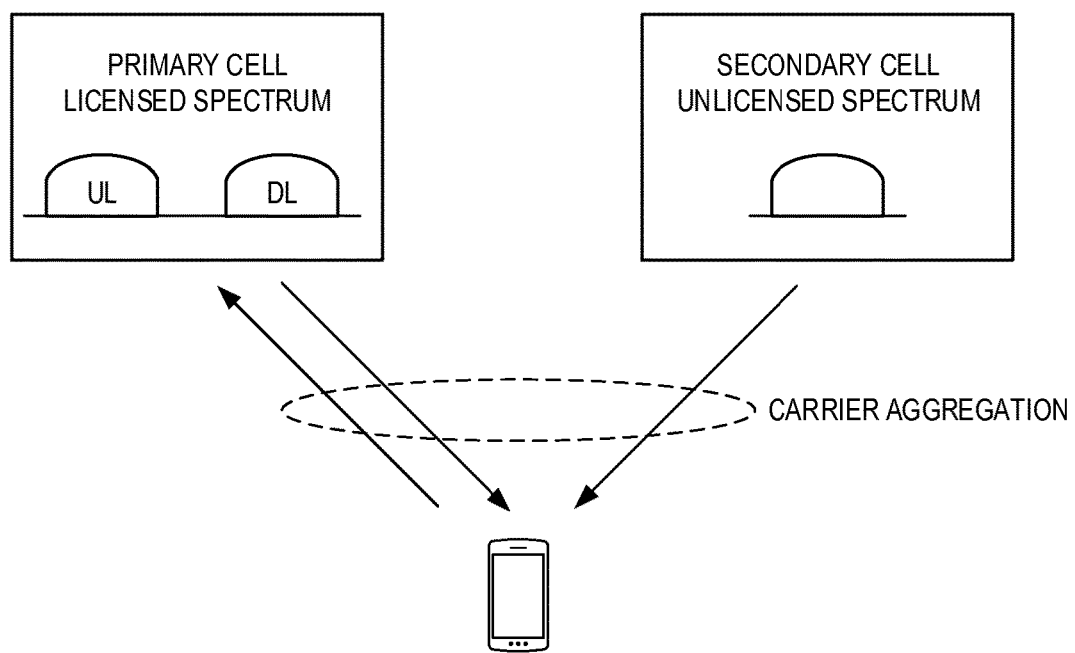
FIG. 6 illustrates a License Assisted Secondary Cell (LA SCell) operating in an unlicensed frequency spectrum.
Figure 7:
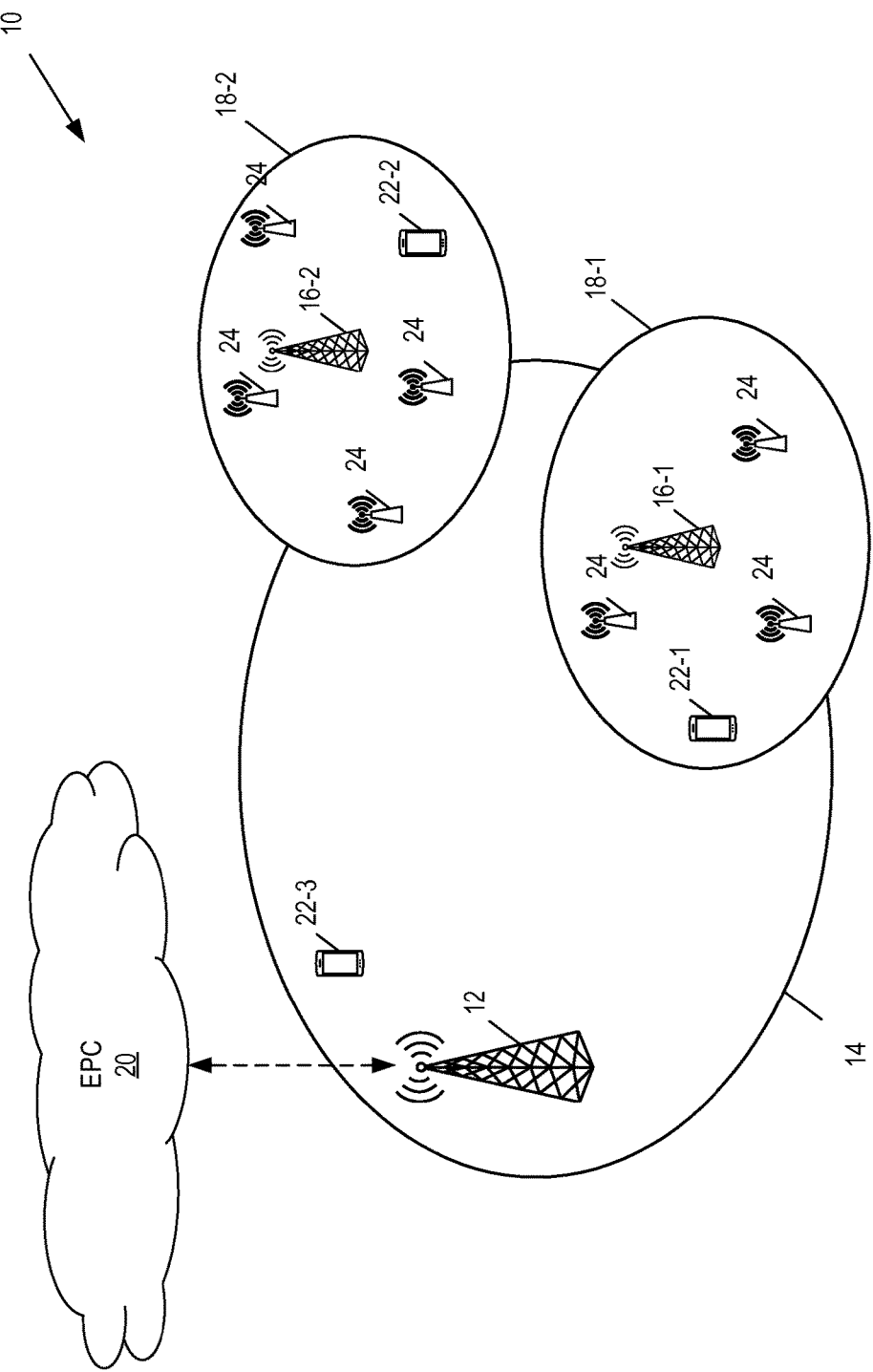
FIG. 7 illustrates one example of a cellular communications network according to embodiments of the present disclosure.

FIG. 7 illustrates a cellular communications network 10 according to some embodiments of the present disclosure. In this example, the cellular communications network 10 is a LTE network (e.g., a License Assisted Access Long Term Evolution (LAA-LTE) network or a Long Term Evolution in Unlicensed Spectrum (LTE-U) network) that includes a base station 12, which in LTE is referred to as an enhanced or evolved Node B (eNB), controlling a corresponding macro cell 14. The cellular communications network 10 also includes a number of low power nodes 16-1 and 16-2 controlling corresponding small cells 18-1 and 18-2. In LTE, the low power nodes 16-1 and 16-2 are, e.g., low power base stations (e.g., base stations for small cells such as, e.g., pico cells), Remote Radio Heads (RRHs), a split radio such as a Radio Dot, or the like. Thus, the low power nodes 16-1 and 16-2 may be full base stations or the functionality of a base station (i.e., the functionality of an eNB) may be split between the low power nodes 16-1 and 16-2 and another network node. The split in functionality may be between different layers of the LTE protocol stack (e.g., between the PHY-MAC layers, between the Radio Link Control (RLC) and Medium Access Control (MAC) layers, or between the Packet Data Convergence Protocol (PDCP) and RLC layers). Notably, while not illustrated, one or more of the small cells 18-1 and 18-2 may alternatively be provided by the base station 12. The low power nodes 16-1 and 16-2 are generally referred to herein collectively as low power nodes 16 and individually as low power node 16. Likewise, the small cells 18-2 through 18-2 are generally referred to herein collectively as small cells 18 and individually as small cell 18. The base station 12 (and optionally the low power nodes 16) is connected to a core network 20 (e.g., an Evolved Packet Core (EPC)).

The base station 12 and the low power nodes 16 provide service to wireless devices 22-1 through 22-3 in the corresponding cells 14 and 18. The wireless devices 22-1 through 22-3 are generally referred to herein collectively as wireless devices 22 and individually as wireless device 22. In LTE, the wireless devices 22 are referred to as User Equipment devices (UEs). As used herein, a wireless device 22 or UE is to include any type of wireless device capable of transmitting to and/or receiving from the base station 12 and/or the low power nodes 16. This includes UEs such as smart phones, tablet computers, etc., and also includes Machine Type Communication (MTC) devices (e.g., sensors).

In some embodiments, each radio access node (e.g., the base station 12 and each of the low power nodes 16) typically implements both the licensed and unlicensed carriers (i.e., both a Primary Cell (PCell) and a Secondary Cell (SCell)). However, there may be alternate embodiments where the PCell and the SCell are provided by two different radio access nodes. In the illustrated example, the macro cell 14 is provided in the licensed frequency spectrum (i.e., in the frequency spectrum dedicated for the cellular communications network 10), whereas one or more (and possibly all) of the small cells 18 are provided in both a licensed frequency spectrum and an unlicensed frequency spectrum (e.g., the 5 Gigahertz (GHz) frequency spectrum). Using the wireless device 22-1 as an example, the small cell 18-1 is both a License Assisted (LA) PCell and a LA SCell of the wireless device 22-1. Thus, in this context, the small cell 18-1 is sometimes referred to herein as both the LA PCell and the LA SCell 18-1 of the wireless device 22-1. Notably, as used herein, a LA SCell 18 is a PCell that operates in the licensed frequency band and a SCell that operates in the unlicensed frequency band. However, alternatively again, the macro base station 12 could provide the LA PCell 14 and the low power node 16-1 could provide the LA SCell 18-1 of the wireless device 22-1.

Using the low power node 16-1 as an example, when selecting a channel in the unlicensed frequency band on which to operate, the low power node 16-1 (or some network node controlling the low power node 16-1 such as, e.g., the base station 12) detects a number of Wi-Fi APs 24 operating on a potential channel. For instance, the number of Wi-Fi APs 24 on each of a number of potential channels is detected. Then, for example, the channel having the fewest Wi-Fi APs 24 is selected as the channel for the LA SCell 18-1. The selection of the channel is typically performed periodically by, in this example, the low power node 16-1. The period should be chosen according to the expected rate of change in the AP neighborhood. As a simplification, the selection could be performed only at startup of the low power node 16-1.

Systems and methods are described herein that enable the detection of the number of Wi-Fi APs 24 on a particular channel in the unlicensed frequency band using LTE receiver hardware (e.g., LTE sampling rate and, potentially, LTE Fast Fourier Transform (FFT)). In particular, LAA-LTE (and LTE-U) base stations, such as the low power nodes 16, (and potentially other wireless radio technologies as well) would like to select an operating channel with the least Wi-Fi contention. One measure of contention is the number of co-channel Wi-Fi APs 24 that use the channel as their primary channel. This can be measured by finding the number of beacons on the channel.

Figure 8A:
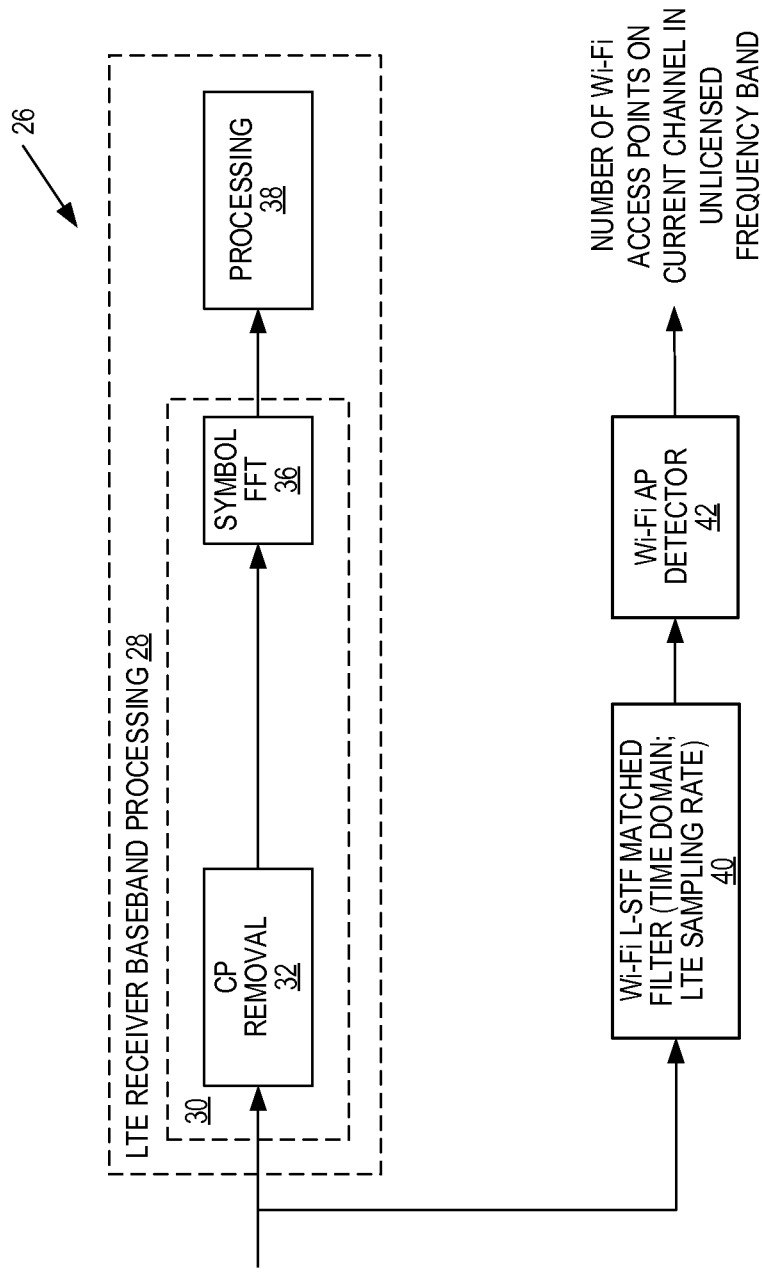
FIGS. 8A through 8C illustrate example embodiments of a LTE baseband receiver that performs Wi-Fi preamble and/or beacon detection according to some embodiments of the present disclosure.
Figure 8B:
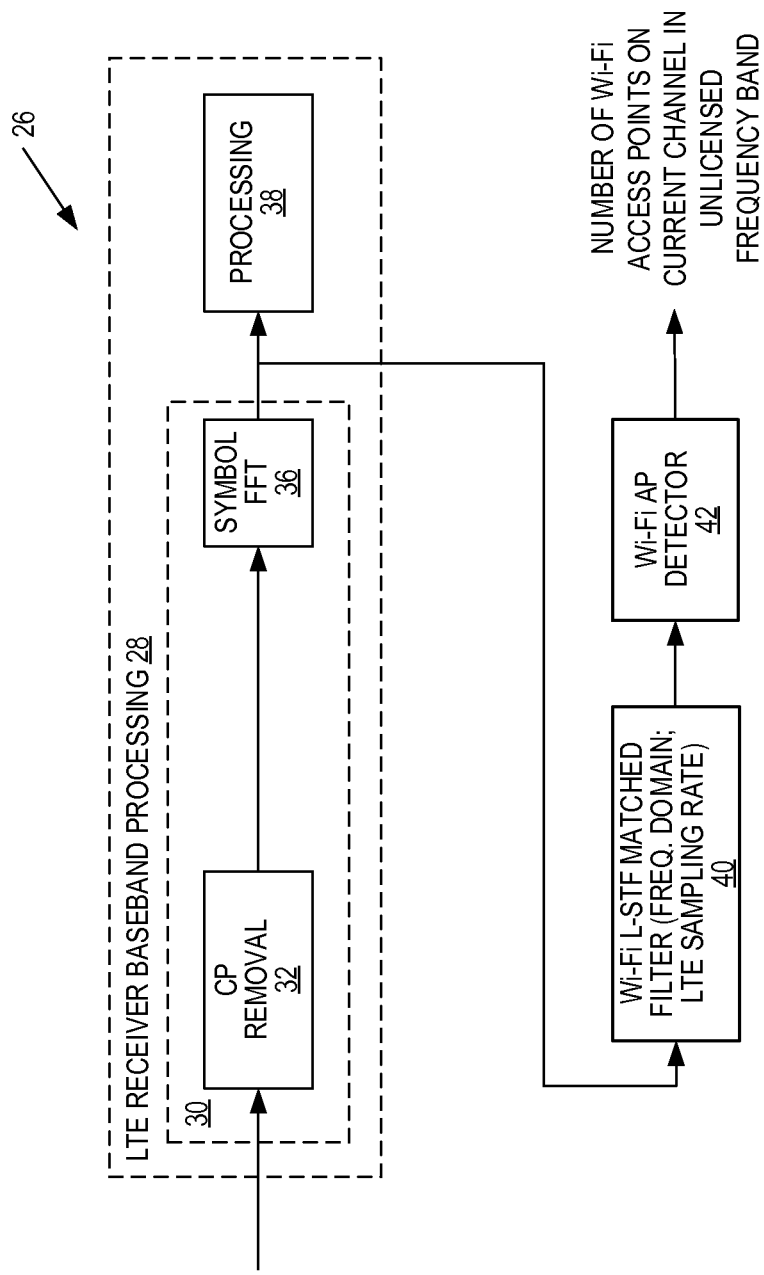
Figure 8C:
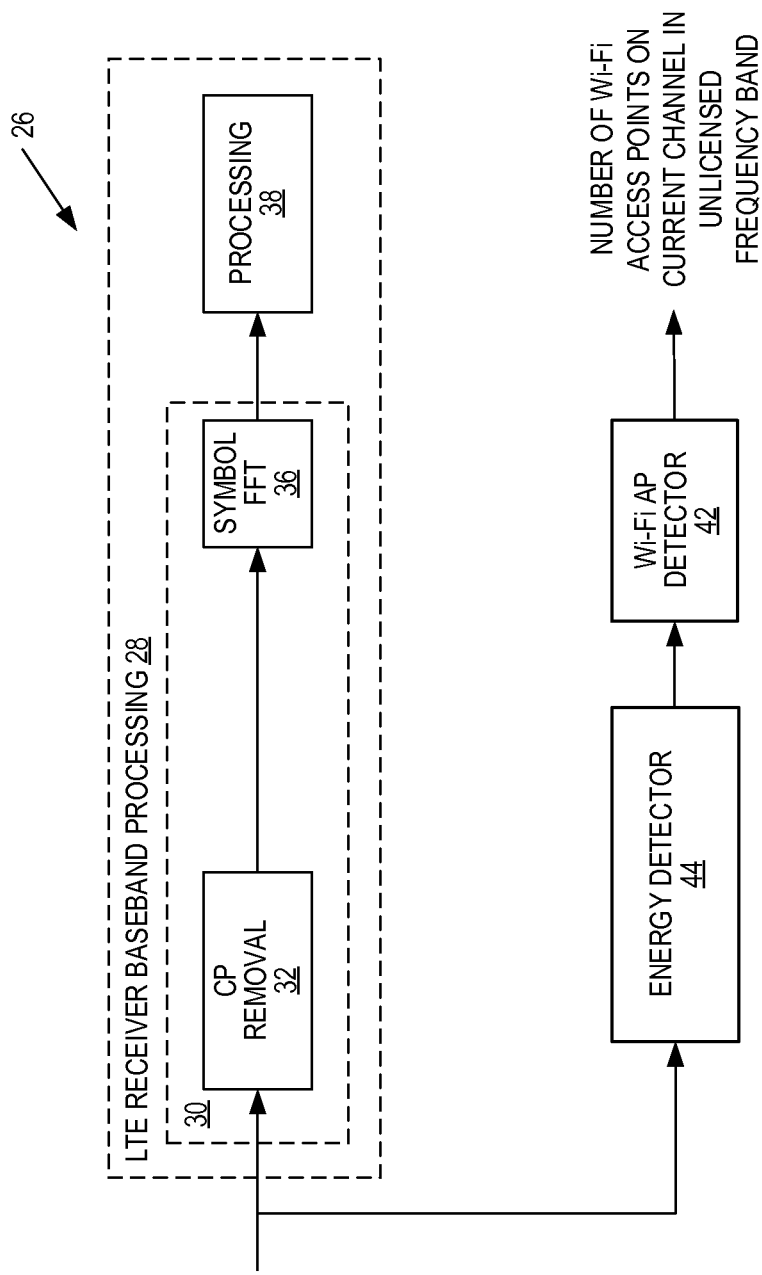

One problem is how to measure the number of Wi-Fi beacons on a channel using LTE receiver hardware. FIGS. 8A through 8C illustrate some example embodiments of an LTE baseband receiver 26 that utilize LTE receiver hardware to detect Wi-Fi preambles and/or Wi-Fi beacons, depending on the particular embodiment. The LTE baseband receiver 26 (for, e.g., the LA SCell 18-1) may be implemented at the low power node 16-1 or some other network node (e.g., the base station 12). As illustrated, in this example, the LTE baseband receiver 26 includes LTE receiver baseband processing circuitry 28, which includes a data processing portion 30. The data processing portion 30 includes a Cyclic Prefix (CP) removal function 32, and a symbol FFT function 36. The CP removal function 32 removes the CP of a receive signal. Notably, for Wi-Fi preamble or beacon detection (particularly in the embodiment of FIG. 8B), the CP removal function 32 may, in some implementations, be disabled since the LTE symbol time will not, in general, be time aligned with the start of the Wi-Fi preamble. The received signal is then divided into time pieces corresponding to a fraction (e.g., approximately $1/14$ or $1/12$) of a millisecond, where these pieces are referred to as symbols. The symbol FFT function 36 then performs an FFT per symbol. In particular, for a 20 Megahertz (MHz) bandwidth, the symbol FFT function 36 performs a 2,048 point FFT per symbol. The resulting frequency domain signal pieces are then provided to a processing function 38 for further signal processing, as will be appreciated by one of ordinary skill in the art.

In addition, in this embodiment, the LTE baseband receiver 26 includes Wi-Fi detection circuitry including a Wi-Fi Legacy Short Training Field (L-STF) matched filter 40 that operates to perform matched filtering of the received signal using a filter impulse response that matches the L-STF waveform, but sampled at the LTE sampling rate, as discussed below in more detail. A Wi-Fi AP detector 42 then operates to detect the number of Wi-Fi APs 24 on the current channel based on the output of the Wi-Fi L-STF matched filter 40, as discussed below in more detail. In some embodiments, the number of Wi-Fi APs 24 is determined based on Wi-Fi preamble detection and known physical layer signatures, or characteristics, of Wi-Fi beacons. In other embodiments, the number of Wi-Fi APs 24 is determined based on detection and accumulation of energy in the output of the Wi-Fi L-STF matched filter 40. Notably, while the Wi-Fi AP detector 42 detects the number of Wi-Fi APs 24 in this example, the Wi-Fi AP detector 42 may alternatively be a more general detector that detects Wi-Fi preambles, where the detection of the Wi-Fi preambles may be utilized for any desired purpose. FIG. 8B is similar to that of FIG. 8A, but where the Wi-Fi L-STF matched filter 40 operates in the frequency domain. FIG. 8C is similar to that of FIG. 8A, but where Wi-Fi preamble and/or beacon detection is performed based on detection of energy in the received signal by an energy detector 44, as discussed below in detail. Notably, each of the Wi-Fi L-STF matched filter 40, the Wi-Fi AP detector 42, and the energy detector 44 may be implemented in hardware, software, or a combination thereof.

In some embodiments, the Wi-Fi AP detector 42 operates to detect the preambles of Wi-Fi frames and then detect the number of Wi-Fi beacons (and thus the number of Wi-Fi APs 24 on the channel) by looking for periodicity of detected Wi-Fi preambles at the nominal beacon interval of 102.4 milliseconds (ms).

Wi-Fi Preamble Detection

LTE sampling:
  Rate: 30.72 MHz (2048×15 kilohertz (kHz))
  Symbol duration: 66.6 . . . microseconds (µs) (2048/30.72 MHz)

Wi-Fi sampling:
  Rate: 20 MHz (64×312.5 kHz)
  Symbol duration: 3.2 µs (64/20 MHz)

Wi-Fi L-STF:
  Tones every fourth subcarrier, i.e., every 1.250 MHz (4×312.5 kHz)
    Time domain waveform repeats four times per symbol
    L-STF duration of 8 µs (10 repetitions of the 0.8 µs waveform)

Time Domain Wi-Fi Preamble Detection

The Wi-Fi Short Training Field (STF) duration is a non-integer number of LTE samples (245.76 samples (8 µs×30.72 MHz)). Simple time domain self-correlation is not practical, unless interpolation is added.

In some embodiments, matched filtering of the received signal with a filter impulse response that matches the STF waveform, but sampled at the LTE sampling rate, is utilized to detect Wi-Fi preambles. For example, a 256 point Finite Impulse Response (FIR) filter of the STF waveform at LTE sampling rate (30.72 MHz) provides a filter duration of 8.3 µs. Shorter FIR filters could also be used as long as the impulse response is greater than the minimum repetition interval of the STF of 0.8 µs. The FIR filter is applied as a sliding window, i.e., a new output value is calculated as each new input sample arrives.

Figure 9:
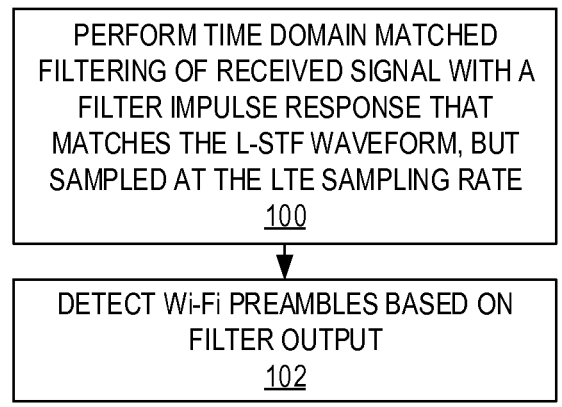
FIG. 9 illustrates a process for Wi-Fi preamble detection using a time domain matched filter with a filter impulse response that matches a Wi-Fi Legacy Short Training Field (L-STF) waveform, but sampled at the LTE sampling rate, according to some embodiments of the present disclosure.

FIG. 9 illustrates a process for time domain Wi-Fi preamble detection according to some embodiments of the present disclosure. This process may be performed by, e.g., the Wi-Fi L-STF matched filter 40 and the Wi-Fi AP detector 42 of FIG. 8A. As illustrated, time domain matched filtering of the received signal is performed with a filter impulse response that matches the L-STF waveform, but sampled at the LTE sampling rate (step 100). Wi-Fi preambles are detected based on the output of the matched filter (step 102). For example, a magnitude of the output of the matched filter may be compared to a predetermined threshold. If the output of the matched filter exceeds the predetermined threshold, a Wi-Fi preamble is detected. Once the output of the matched filter exceeds the threshold, detection is put on hold for the duration of a minimum length Wi-Fi frame, e.g., 24 µs. This prevents erroneous detection of more than one frame within the duration of a single minimum duration frame. In some embodiments, the threshold may be dynamically adjusted according to, e.g., the noise level of the channel in order to, e.g., reduce the likelihood of false detections.

Frequency Domain Wi-Fi Preamble Detection

Wi-Fi STF subcarriers do not align with the LTE subcarriers. There is one STF subcarrier per 83.33 LTE subcarriers (1.250 MHz/15 kHz), and alignment only every third STF subcarrier (3.75 MHz).

In some embodiments, Wi-Fi preamble detection is performed based on matched filtering in the frequency domain. This replaces time domain convolution with frequency domain multiplication. Here, the complex conjugate of the FFT of the STF waveform is multiplied by the FFT of the received waveform, both sampled at the LTE rate. For Wi-Fi preamble detection, an Inverse FFT (IFFT) and peak detector can be used.

Figure 10:
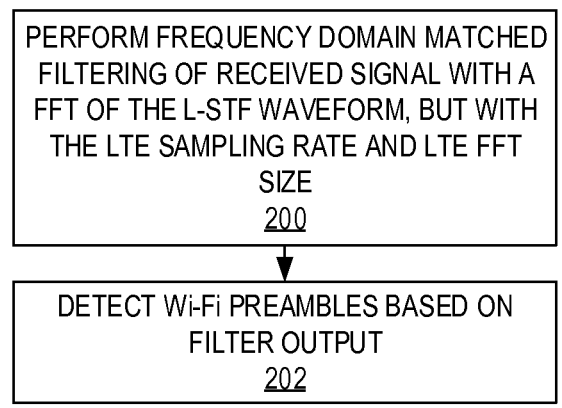
FIG. 10 illustrates a process for Wi-Fi preamble detection using a time domain matched filter with a Fast Fourier Transform (FFT) of the Wi-Fi L-STF waveform, but with the LTE sampling rate and LTE FFT, according to some embodiments of the present disclosure.

FIG. 10 illustrates a process for frequency domain Wi-Fi preamble detection according to some embodiments of the present disclosure. This process may be performed by, e.g., the Wi-Fi L-STF matched filter 40 and the Wi-Fi AP detector 42 of FIG. 8B. As illustrated, frequency domain matched filtering of the received signal is performed with a FFT of the L-STF waveform, but with the LTE sampling rate and LTE FFT size (step 200). Wi-Fi preambles are detected based on the output of the matched filter (step 202). For example, an IFFT of the output of the Wi-Fi L-STF matched filter 40 may be performed. A peak detector then detects peaks in the IFFT output (i.e., a Wi-Fi preamble is detected when a peak in the IFFT output exceeds a predetermined threshold). As with the time domain implementation, the frequency domain filter is applied as a sliding window, i.e., a new FFT, multiplication, IFFT sequence is performed as each new time domain sample arrives. In some embodiments, the threshold may be dynamically adjusted according to, e.g., the noise level of the channel in order to, e.g., reduce the likelihood of false detections.

Beacon Pattern Detection

Figure 11:
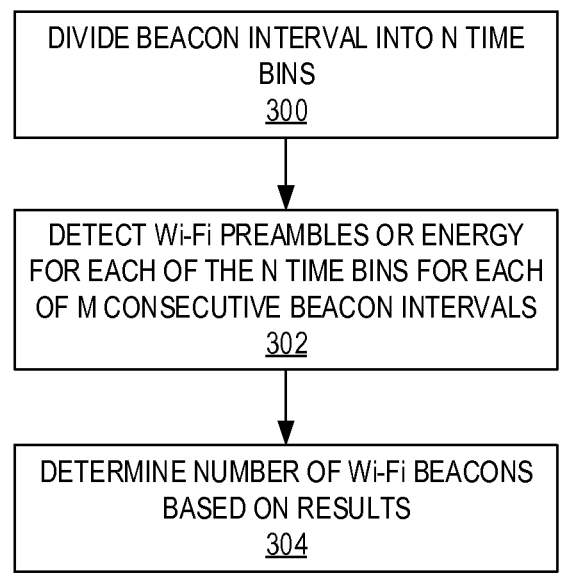
FIG. 11 illustrates a process for Wi-Fi beacon detection according to some embodiments of the present disclosure.

Embodiments for Wi-Fi beacon detection are also disclosed. In this regard, FIG. 11 is a flow chart that illustrates a process for detecting the number of Wi-Fi beacons (and thus the number of co-channel Wi-Fi APs 24) according to some embodiments of the present disclosure. As illustrated, the beacon interval is divided into N time bins whose duration is the approximate duration of a beacon, e.g., N=256 creates bins of 0.4 ms each (step 300). Wi-Fi preambles or energy is detected for each of the N time bins for each of M consecutive beacon intervals (step 302). M is preferably large, e.g., 32. However, the value of M is chosen as a tradeoff between low measurement delay (requiring a low M) and reduced likelihood of false detection (requiring a high M). The number of Wi-Fi beacons is determined based on the results of the detection in step 302 (step 304). In general, the detected preambles and/or detected energy in the time bins is compared to, or correlated with, known physical signatures of Wi-Fi beacons (e.g., periodicity, received signal strength, time duration, and/or the like) to determine the number of Wi-Fi beacons on the channel. Some examples of the process of FIG. 11 are illustrated in FIGS. 12 through 15, which are described below.

Beacon Pattern Detection Using Preambles

Figure 12:
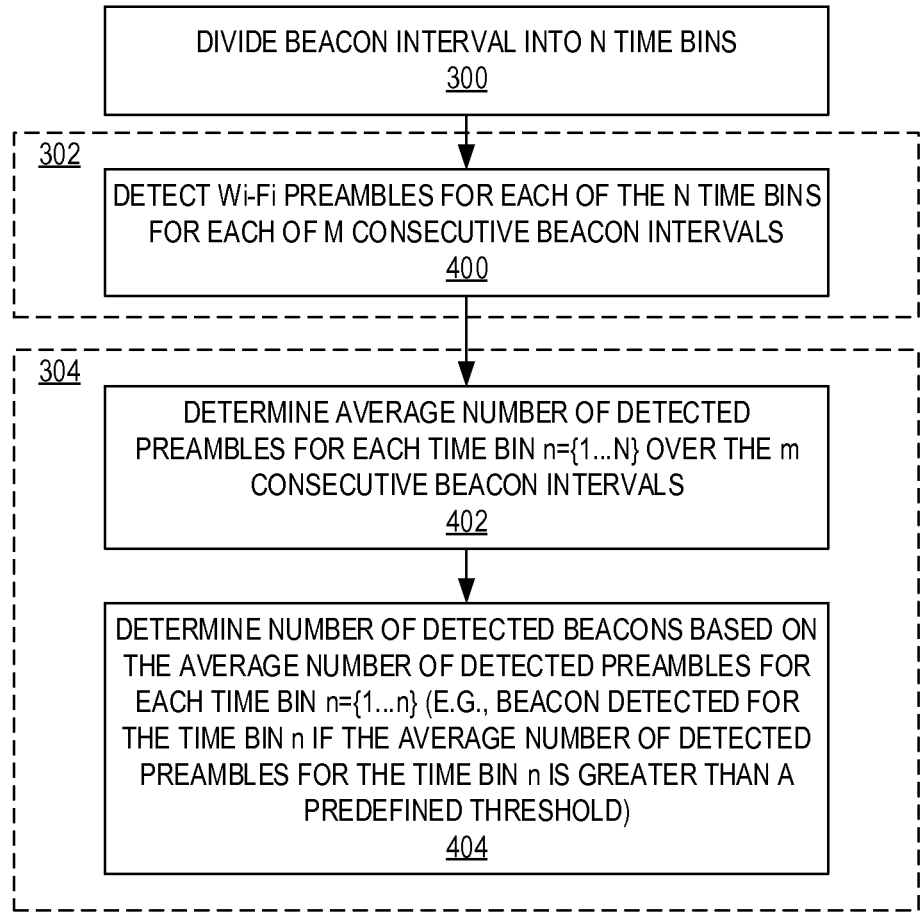
FIG. 12 illustrates a process for Wi-Fi beacon detection based on detected Wi-Fi preambles according to some embodiments of the present disclosure.

Preamble detection (as described above) detects both beacon and non-beacon frames. To identify which preambles likely belong to beacons, one can look for a repeating pattern of detected preambles at the nominal beacon interval (102.4 ms). In this regard, FIG. 12 illustrates a process for detecting Wi-Fi beacons based on Wi-Fi preamble detection according to some embodiments of the present disclosure. As illustrated, the beacon interval is divided into N time bins whose duration is the approximate duration of a beacon, e.g., N=256 creates bins of 0.4 ms each (step 300). Wi-Fi preambles are detected for each of the N time bins for each of M consecutive beacon intervals (step 400). The number of preambles detected in each of the N time bins is counted. M is preferably large, e.g., 32. However, the value of M is chosen as a tradeoff between low measurement delay (requiring a low M) and reduced likelihood of false detection (requiring a high M). In this example, the number of Wi-Fi beacons is determined (step 304) by determining, over the M consecutive beacon intervals, the average number of Wi-Fi preambles detected per time bin (step 402). The number of detected Wi-Fi beacons is determined based on the average number of detected preambles for each time bin (step 404). For example, a Wi-Fi beacon is detected for a time bin if the average number of detected preambles for the time bin is greater than a predefined threshold. Assuming only one beacon per bin, the count of bins that exceed the threshold is an estimate of the number of beacons.

Figure 13:
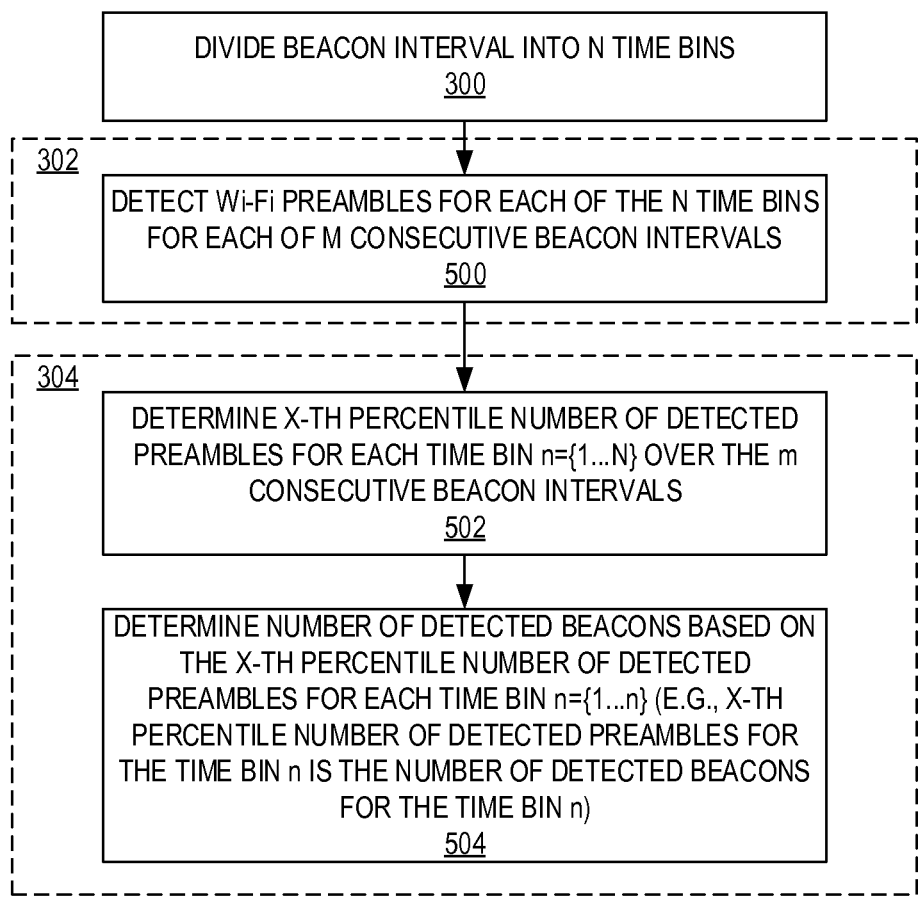
FIG. 13 illustrates a process for Wi-Fi beacon detection based on detected Wi-Fi preambles according to some other embodiments of the present disclosure.

FIG. 13 illustrates a process for detecting Wi-Fi beacons based on Wi-Fi preamble detection according to some other embodiments of the present disclosure. As illustrated, the beacon interval is divided into N time bins whose duration is the approximate duration of a beacon, e.g., N=256 creates bins of 0.4 ms each (step 300). Wi-Fi preambles are detected for each of the N time bins for each of M consecutive beacon intervals (step 500). The number of preambles detected in each of the N time bins is counted. M is preferably large, e.g., 32. However, the value of M is chosen as a tradeoff between low measurement delay (requiring a low M) and reduced likelihood of false detection (requiring a high M). In this example, the number of Wi-Fi beacons is determined (step 304) by determining, over the M consecutive beacon intervals, the x-th percentile number of Wi-Fi preambles detected over the M occurrences of each time bin (step 502). The number of detected Wi-Fi beacons is determined based on the x-th percentile number of detected preambles for each time bin (step 504). For example, the number of Wi-Fi beacons for a time bin is, in some embodiments, determined to be the x-th percentile number of detected preambles for that time bin. A typical value for x is the 5th percentile. The x-th percentile is used, rather than the minimum number, to account for bins where the beacon was either delayed (therefore occurring in another bin), erased by the channel, or may not be sent at all due to the channel not being clear.

Beacon Pattern Detection Using Energy Detection

In some embodiments, Wi-Fi beacon detection can be performed using energy detection. An alternate method of detecting the existence of frames is to detect the energy level in each bin. To discriminate between repeating beacon frames and non-beacon frames that are distributed somewhat randomly over time, one can sum the energy over time bins belonging to a large number, M, of consecutive beacon intervals. In time bins that contain a repeating beacon, the energy will accumulate, while in time bins that do not contain beacons, much less accumulation is expected.

To detect which time bins contain a beacon, apply a threshold to the summed energy in a bin. Only those bins whose energy sum exceeds the threshold are declared to contain a beacon. The estimated number of beacons is then a count of the number of time bins containing a beacon.

The energy measurement can be done in one of two ways: (a) measure the total received energy over the time bin duration over the 20 MHz channel or (b) measure the maximum value of the output of the matched filter used for preamble detection over the time bin duration.

Figure 14:
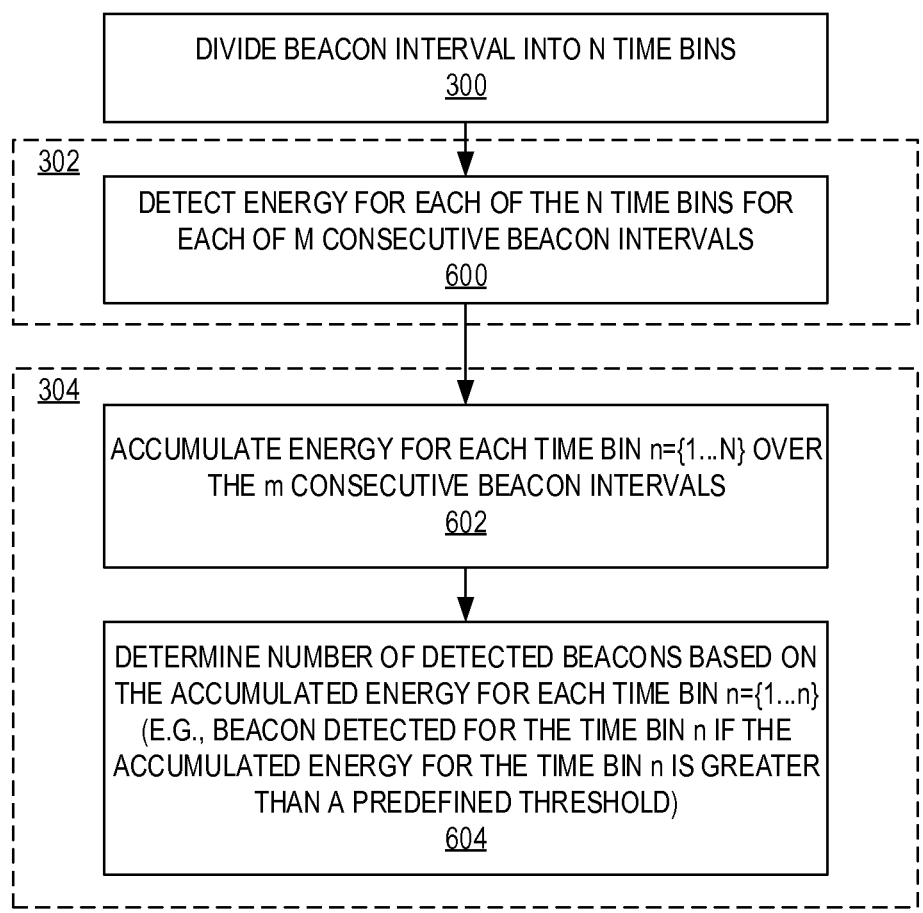
FIG. 14 illustrates a process for Wi-Fi beacon detection based on energy detection according to some embodiments of the present disclosure.

FIG. 14 illustrates a process for detecting Wi-Fi beacons based on total energy received over the 20 MHz channel according to some embodiments of the present disclosure. As illustrated, the beacon interval is divided into N time bins whose duration is the approximate duration of a beacon, e.g., N=256 creates bins of 0.4 ms each (step 300). Energy of the received signal across the full bandwidth (i.e., across the full 20 MHz bandwidth for LTE) is detected for each of the N time bins for each of M consecutive beacon intervals (step 600). M is preferably large, e.g., 32. However, the value of M is chosen as a tradeoff between low measurement delay (requiring a low M) and reduced likelihood of false detection (requiring a high M). In this example, the number of Wi-Fi beacons is determined (step 304) by accumulating the detected energy for each time bin over the M consecutive beacon intervals (step 602). The number of detected Wi-Fi beacons is determined based on the accumulated energy for each time bin (step 604). For example, for a particular time bin, that time bin is determined to include a beacon if the accumulated energy for that time bin is greater than a predetermined threshold. In some embodiments, the threshold may be dynamically adjusted according to, e.g., the noise level of the channel in order to, e.g., reduce the likelihood of false detections.

Figure 15:
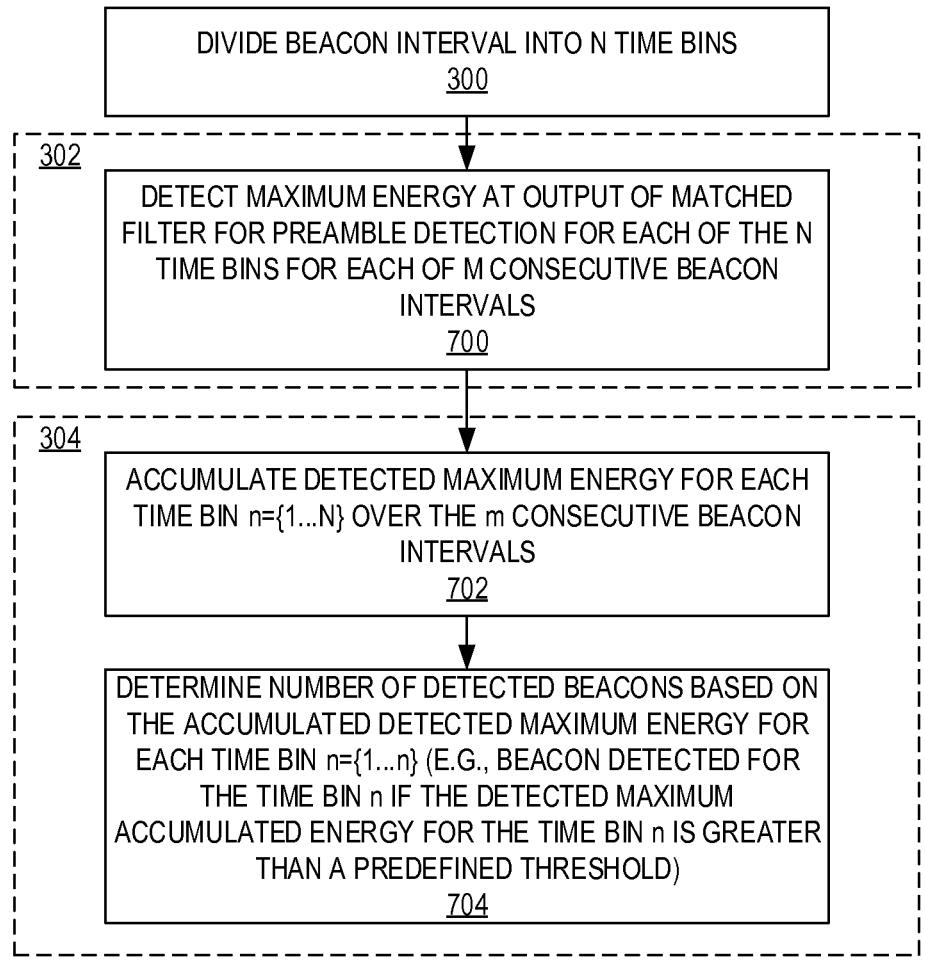
FIG. 15 illustrates a process for Wi-Fi beacon detection based on energy detection according to some other embodiments of the present disclosure.

FIG. 15 illustrates a process for detecting Wi-Fi beacons based on a measure of the maximum value of the output of the Wi-Fi L-STF matched filter 40 (which may also be used for preamble detection) over the time bin duration according to some other embodiments of the present disclosure. As illustrated, the beacon interval is divided into N time bins whose duration is the approximate duration of a beacon, e.g., N=256 creates bins of 0.4 ms each (step 300). A maximum energy of the matched filter output (over the time bin duration) is determined for each of the N time bins for each of M consecutive beacon intervals (step 700). M is preferably large, e.g., 32. However, the value of M is chosen as a tradeoff between low measurement delay (requiring a low M) and reduced likelihood of false detection (requiring a high M). In this example, the number of Wi-Fi beacons is determined (step 304) by accumulating the detected maximum energy for each time bin over the M consecutive beacon intervals (step 702). The number of detected Wi-Fi beacons is determined based on the accumulated maximum energy for each time bin (step 704). For example, for a particular time bin, that time bin is determined to include a beacon if the accumulated maximum energy for that time bin is greater than a predetermined threshold. More specifically, for a particular time bin n, the maximum energy is evaluated over a single occurrence of the time bin n, and then the M maximum values for the time bin n are summed to provide the accumulated maximum energy for the time bin n. The accumulated maximum energy for the time bin n is then compared to a predetermined threshold to determine whether the time bin n includes a beacon. In some embodiments, the threshold may be dynamically adjusted according to, e.g., the noise level of the channel in order to, e.g., reduce the likelihood of false detections.

Time Domain Detection of Wi-Fi Beacon Pattern

Regardless of whether beacon detection is performed based on Wi-Fi preamble detection or energy detection, beacon detection may be performed based on the correlation of one or more parameters including: start time of detected Wi-Fi preambles or detected energy burst, Received Signal Strength Indication (RSSI) of detected Wi-Fi preambles or detected energy level, time duration of detected Wi-Fi preambles or time duration of detected energy burst corresponding to a Wi-Fi preamble, or the like, or any combination thereof.

Time Domain Correlation

Since the expected delay between beacons is 102.4 ms, one can simplify the correlation by only performing the summation at the period of 102.4 ms. Since non beacon transmissions rarely occur with a 102.4 ms period, the energy summation over many periods will accentuate the repeating beacons.

RSSI

Since both the LAA-LTE receiver and the Wi-Fi AP are fixed in location, the path loss between them remains relatively constant. Therefore, the RSSI of a particular Wi-Fi beacon will remain almost constant.

In this case, beacon detection may be performed by comparing instances of beacon energy (e.g., RSSI of the detected preamble, or of the received energy if preamble detection is not performed). The variance of the energy in a bin (from either the filtered preamble strength, or the total received energy) in each periodic time bin is calculated. If the variance is greater than a threshold, declare that the bin does not contain a beacon.

Time Duration

Beacons from a Wi-Fi AP 24 are sent at the same modulation and coding rate and with the same number of bytes, resulting in a constant duration of the PHY Protocol Data Unit (PDU) of the beacon. In this case, beacon detection may be performed by measuring the start and end time of the detected frames; the duration is the difference. The durations in periodic bins are compared to help decide whether a beacon exists in that bin. The end of a frame can be detected by monitoring the received energy after a detected preamble. When the energy drops by a threshold amount (e.g., 10 decibels (dB)), declare the end of the frame. Notably, beacons from a particular Wi-Fi AP 24 will have the same duration. However, beacons from different Wi-Fi APs 24 may have different durations. As such, duration can be used to distinguish a beacon pattern of one Wi-Fi AP 24 from a beacon pattern of another Wi-Fi AP 24. More importantly, beacons can be distinguished from data frames since the beacons have a constant duration while data frames typically have varying durations due to variations in both packet size (bits) and data rate (bits per second).

Figure 16:
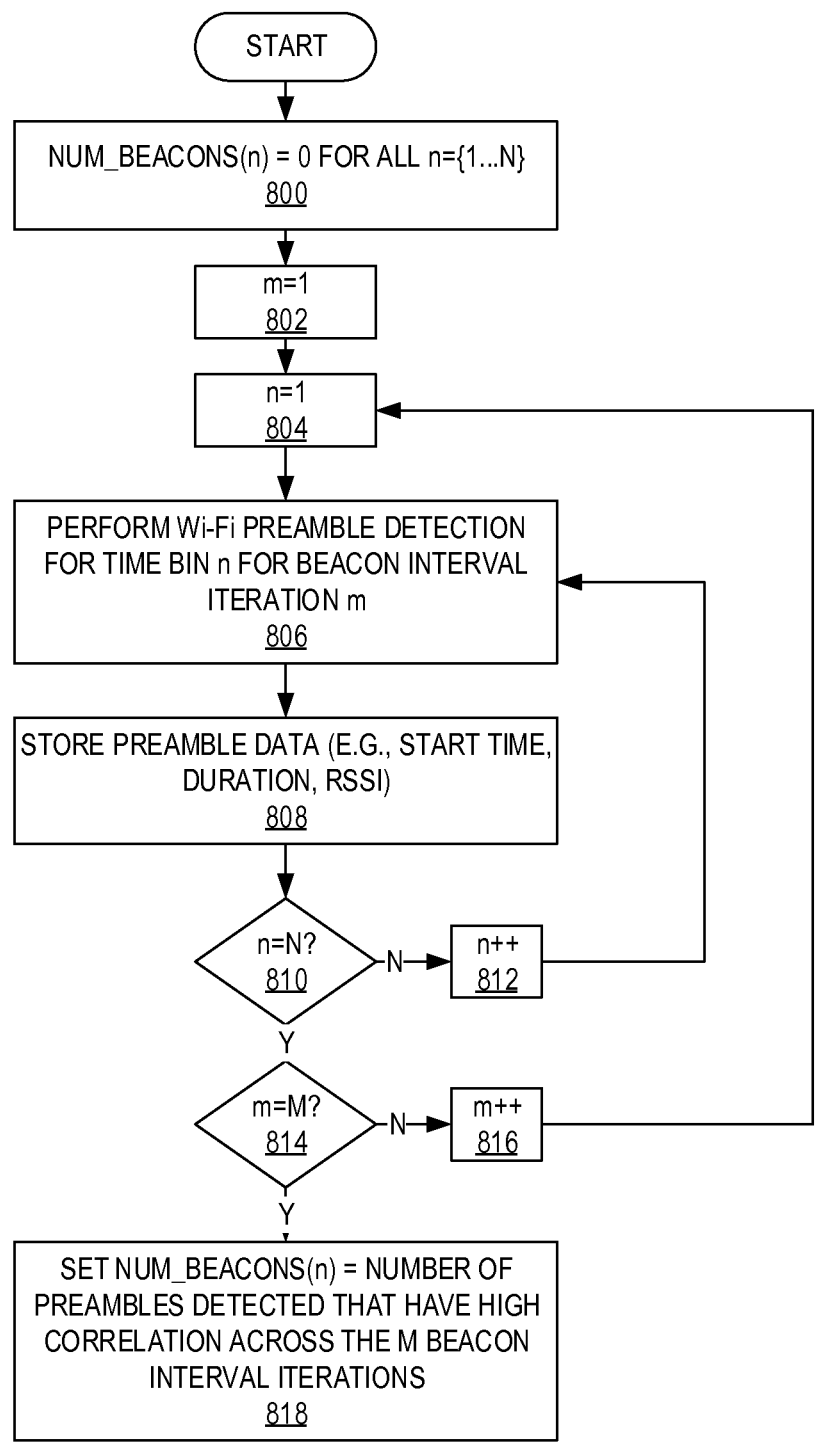
FIG. 16 illustrates a process for Wi-Fi beacon detection based on correlation of time domain parameter(s) for detected Wi-Fi preambles according to some embodiments of the present disclosure.

FIG. 16 illustrates one example beacon detection process that is based on correlation of one or more parameters (e.g., start time, RSSI, and/or duration) of detected Wi-Fi preambles in the time bins across the M consecutive beacon intervals according to some embodiments of the present disclosure. Notably, while this process is based on Wi-Fi preamble detection, a similar process may be used to detect Wi-Fi beacons based on energy detection and correlation of parameter(s) of detected energy with known physical properties/signatures of Wi-Fi beacons. As illustrated, first, initialization is performed (step 800). In particular, in this example, NUM_BEACONS(n) is set to 0 for all n={1 . . . N}. NUM_BEACONS(n) is the number of Wi-Fi beacons detected for time bin n. Counters m and n are set to 1 (steps 802 and 804), where m is the beacon interval counter and n is the time bin counter. Wi-Fi preamble detection for time bin n for beacon interval m is performed (step 806). Wi-Fi preamble detection can be performed in the time domain (e.g., using the time domain Wi-Fi L-STF matched filter 40 of FIG. 8A) or in the frequency domain (e.g., using the frequency domain Wi-Fi L-STF matched filter 40 of FIG. 8B). Data for any detected Wi-Fi preambles (e.g., start time, duration, and/or RSSI) is obtained and stored (step 808).

The process then determines whether n=N (i.e., determines whether the last time bin has been processed) (step 810). If not, the time bin counter n is incremented (step 812) and the process returns to step 806 to process the next time bin. Once the last time bin has been processed, the process determines whether m=M (i.e., whether the last beacon interval has been processed) (step 814). If not, the beacon interval counter m is incremented (step 816) and the process returns to step 804.

Once the last beacon interval has been processed for each time bin n (for n={1 . . . N}), NUM_BEACONS(n) is set equal to the number of Wi-Fi preambles detected in the time bin n having high correlation across the M beacon intervals (step 818). For example, for start time, a high correlation between the start time of detected beacons for a time bin may be detected if the start times for detected beacons in each of the M instances of the time bin have the same start time within some predefined tolerance range. In some embodiments, start time, duration, and/or RSSI may be considered such that the preamble data for detected preambles for a time bin n can be examined to determine whether there is a high correlation between the start times, duration, and/or RSSI of detected preambles for the time bin n across the M beacon interval iterations. If so, those preambles are determined to be a beacon pattern.

Figure 17:
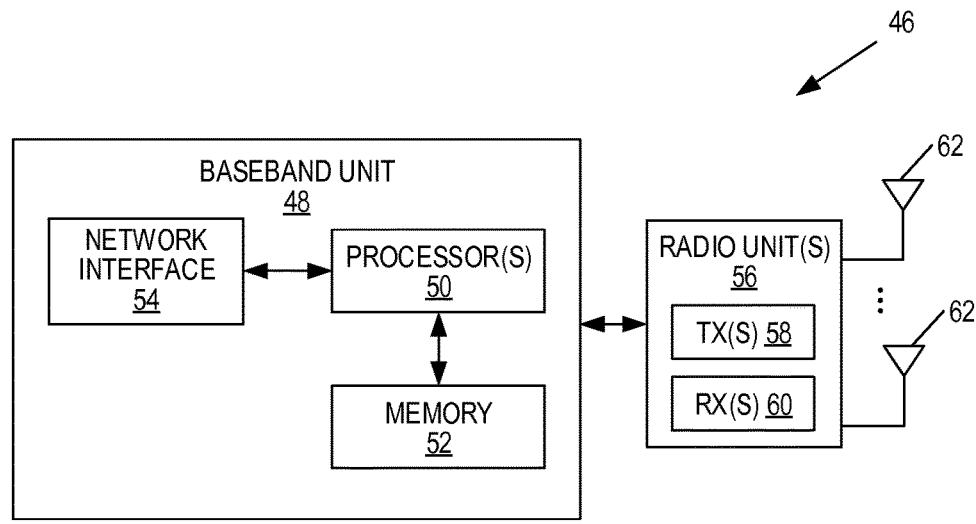
FIGS. 17 and 18 are block diagrams of a Radio Access Network (RAN) node according to some embodiments of the present disclosure.
Figure 18:
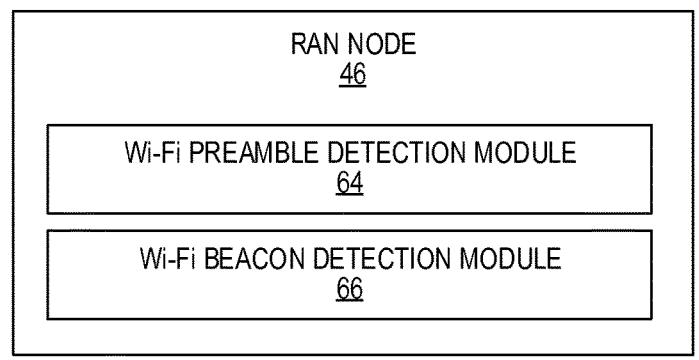

FIGS. 17 and 18 illustrate embodiments of a Radio Access Network (RAN) node 46 according to some embodiments of the present disclosure. The RAN node 46 may be, e.g., a low power node 16 serving a small cell 18 or a base station 12 serving a macro cell 14. As illustrated in FIG. 17, the RAN node 46 includes a baseband unit 48 that includes one or more processors, or processor circuits, 50 (e.g., Central Processing Units (CPUs), Application Specific Integrated Circuits (ASICs), Field Programmable Gate Arrays (FPGAs), or the like), memory 52, and a network interface 54. In some embodiments, the LTE baseband receiver 26 of FIG. 8A, 8B, or 8C is implemented in hardware in the baseband unit 48 (e.g., in the one or more processors 50) or implemented in a combination of hardware and software in the baseband unit 48 (e.g., implemented by the processor(s) 50 and software stored in the memory 52 and executed by the processor(s) 50). The network interface 54 is circuitry that enables the RAN node 46 to communicate with other RAN nodes 46 and/or the core network 20.

The baseband unit 48 is connected to one or more radio units 56 that include one or more transmitters 58 and one or more receivers 60 coupled to one or more antennas 62. Notably, in some embodiments, the baseband unit 48 and the radio unit(s) 56 are co-located (e.g., implemented in the same RAN node 46 as illustrated). However, in some other embodiments, the baseband unit 48 may be implemented in one network node (e.g., in the base station 12), and the radio unit(s) 56 may be implemented in another network node (e.g., the low power node 16).

In some embodiments, a computer program including instructions which, when executed by at least one processor, causes the at least one processor to carry out as least some of the functionality of a baseband receiver (e.g., the LTE baseband receiver 26 of FIG. 8A, 8B, or 8C) according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 52).

FIG. 18 is a block diagram of the RAN node 46 according to some other embodiments of the present disclosure. As illustrated, the RAN node 46 includes a Wi-Fi preamble detection module 64 and a Wi-Fi beacon detection module 66, each of which is implemented in software. Notably, in some embodiments, the RAN node 46 includes both modules 64 and 66 as shown. However, in other embodiments, the RAN node 46 may include the Wi-Fi preamble detection module 64 or the Wi-Fi beacon detection module 66. The Wi-Fi preamble detection module 64 operates to detect Wi-Fi preambles, as discussed above. The Wi-Fi beacon detection module 66 operates to detect Wi-Fi beacons, as discussed above.

Embodiments of systems and methods for estimating the number of co-channel Wi-Fi beacons on a candidate unlicensed channel using LTE receiver hardware are disclosed. In some embodiments, a method for estimating the number of co-channel Wi-Fi beacons on a candidate unlicensed channel include detecting the existence of Wi-Fi preambles using LTE receiver hardware (e.g., LTE sampling rate and, potentially, LTE FFT), and then detecting a pattern of recurring preambles at the nominal beacon interval.

The present disclosure avoids the cost of implementing a full Wi-Fi receiver in the LTE-U or LAA-LTE eNB while still providing a useful estimate of the number of co-channel Wi-Fi APs on each candidate channel. The estimate is reliable enough for the purpose of comparing the utility of each channel during channel selection. To allow the reuse of LTE hardware, the same sampling rate of received signals as in LTE and, in some embodiments, the same FFT are used.

Again, while much of the discussion herein focuses on LTE and Wi-Fi, the concepts disclosed herein can be used with other types of RATs. For example, LTE receiver hardware can be used to detect APs/nodes for other types of RATs based on any suitable type of known, repetitive transmission by the APs/nodes of the other types of RATs. Further, APs of a first RAT (non-LTE RAT) can use the concepts disclosed herein to detect APs/nodes of a second RAT (e.g., LTE, Wi-Fi, etc.). Lastly, with respect to LTE and Wi-Fi, embodiments for Wi-Fi preamble detection are described herein that focus on the use of the Wi-Fi L-STF. However, other types of known, repetitive Wi-Fi transmissions may be used. For instance, one other example is the Wi-Fi Long Training Field (LTF).

Some example, non-limiting embodiments described herein are as follows:

Embodiment 1: A method of operation of a node of a first RAT comprises performing matched filtering of a received signal based on a known, repetitive (e.g., periodically transmitted) waveform transmitted by APs/nodes of the second RAT, but sampled at a sampling rate used for the first RAT, and detecting transmissions of the known, repetitive waveform by APs/nodes of the second RAT based on results of the matched filtering.

Embodiment 2: The method of embodiment 1 wherein the first RAT is LTE and the second RAT is Wi-Fi.

Embodiment 3: The method of embodiment 2 wherein the known, repetitive waveform is an L-STF waveform, and detecting transmissions of the known, repetitive waveform comprises detecting Wi-Fi preambles based on detection of the L-STF waveform.

Embodiment 4: The method of embodiment 1, 2, or 3 wherein the matched filtering is time domain matched filtering.

Embodiment 5: The method of embodiment 1, 2, or 3 wherein the matched filtering is frequency domain matched filtering.

Embodiment 6: The method of embodiment 5 wherein the frequency domain matched filtering uses a FFT of the known, repetitive waveform, but with the sampling rate of the first RAT and a FFT of the first RAT (e.g., a FFT used for reception of received signals for the first RAT).

Embodiment 7: A method of operation of a node of a first RAT comprises dividing a beacon interval for a second RAT into N time bins, detecting transmissions (e.g., preambles) in the second RAT or energy for each of the N time bins for each of M consecutive beacon intervals, and determining a number of beacons based on the results of the detection for each of the N time bins for each of the M consecutive beacon intervals.

Embodiment 8: The method of embodiment 7 wherein the first RAT is LTE and the second RAT is Wi-Fi.

Embodiment 9: The method of embodiment 8 wherein detecting transmissions in the second RAT or energy for each of the N time bins for each of the M consecutive beacon intervals comprises detecting Wi-Fi preambles for each of the N time bins for each of the M consecutive beacon intervals.

Embodiment 10: The method of embodiment 8 wherein detecting transmissions in the second RAT or energy for each of the N time bins for each of the M consecutive beacon intervals comprises detecting received energy for each of the N time bins for each of the M consecutive beacon intervals.

The following acronyms are used throughout this disclosure.

| | |
|---|---|
| μs | Microsecond |
| 3GPP | Third Generation Partnership Project |
| AP | Access Point |
| ASIC | Application Specific Integrated Circuit |
| CA | Carrier Aggregation |
| CC | Component Carrier |
| CFI | Control Format Indicator |
| CP | Cyclic Prefix |
| CPU | Central Processing Unit |
| CRS | Cell Specific Reference Symbol |
| CSMA/CA | Carrier Sense Multiple Access with Collision Avoidance |
| dB | Decibel |
| DCF | Distributed Coordination Function |
| DFT | Discrete Fourier Transform |
| DIFS | Distributed Inter-Frame Space |
| EIFS | Extended Inter-Frame Space |
| eNB | Enhanced or Evolved Node B |
| EPC | Evolved Packet Core |
| EPDCCH | Enhanced Physical Downlink Control Channel |
| FFT | Fast Fourier Transform |
| FIR | Finite Impulse Response |

-continued

| | |
|---|---|
| FPGA | Field Programmable Gate Array |
| GHz | Gigahertz |
| IFFT | Inverse Fast Fourier Transform |
| kHz | Kilohertz |
| LA | License Assisted |
| LA-LTE | License Assisted Long Term Evolution |
| LAA | License Assisted Access |
| LAA-LTE | License Assisted Access Long Term Evolution |
| LBT | Listen-Before-Talk |
| L-STF | Legacy Short Training Field |
| LTE | Long Term Evolution |
| LTE-U | Long Term Evolution in Unlicensed Spectrum |
| LTF | Long Training Field |
| MAC | Medium Access Control |
| MHz | Megahertz |
| ms | Millisecond |
| MTC | Machine Type Communication |
| OFDM | Orthogonal Frequency Division Multiplexing |
| PCell | Primary Cell |
| PDCCH | Physical Downlink Control Channel |
| PDCP | Packet Data Convergence Protocol |
| PDU | Protocol Data Unit |
| RAN | Radio Access Network |
| RAT | Radio Access Technology |
| RLC | Radio Link Control |
| RRH | Remote Radio Head |
| RSSI | Received Signal Strength Indication |
| SCell | Secondary Cell |
| SIFS | Short Inter-Frame Space |
| STA | Station |
| STF | Short Training Field |
| UE | User Equipment |
| WLAN | Wireless Local Area Network |

Those skilled in the art will recognize improvements and modifications to the embodiments of the present disclosure. All such improvements and modifications are considered within the scope of the concepts disclosed herein and the claims that follow.

What is claimed is:

1. A method of operation of a radio access node of a first Radio Access Technology, RAT, comprising:
receiving a signal sampled at a sampling rate used for the first RAT;
performing frequency domain matched filtering of the received signal with a Fast Fourier Transform, FFT, of a known, repetitive waveform transmitted by access nodes of a second RAT, where the known, repetitive waveform is sampled at the sampling rate used for the first RAT and a FFT size used for the first RAT; and
detecting transmissions of the known, repetitive waveform by access nodes of the second RAT based on results of the matched filtering.

2. The method of claim 1 wherein the first RAT is Long Term Evolution, LTE, and the second RAT is Wi-Fi.

3. The method of claim 2 wherein the known, repetitive waveform is a Legacy Short Training Field, L-STF, waveform, and detecting transmissions of the known, repetitive waveform comprises detecting Wi-Fi preambles based on detection of the L-STF waveform.

4. A radio access node of a first Radio Access Technology, RAT, comprising:
receiver baseband processing circuitry for the first RAT, the receiver baseband processing circuitry operable to receive and process a received signal according to the first RAT at a sampling rate used for the first RAT;
a matched filter operable to perform frequency domain matched filtering of the received signal with a Fast Fourier Transform, FFT, of a known, repetitive waveform transmitted by access nodes of a second RAT, where the known, repetitive waveform is sampled at the sampling rate used by the receiver baseband processing circuitry for the first RAT and a FFT size used for the first RAT; and
a detector operable to detect transmissions of the known, repetitive waveform by access nodes of the second RAT based on results of the matched filtering.

5. The radio access node of claim 4 wherein the first RAT is Long Term Evolution, LTE, and the second RAT is Wi-Fi.

6. The radio access node of claim 5 wherein the known, repetitive waveform is a Legacy Short Training Field, L-STF, waveform, and detecting transmissions of the known, repetitive waveform comprises detecting Wi-Fi preambles based on detection of the L-STF waveform.

7. A method of operation of a radio access node of a first Radio Access Technology, RAT, comprising:
dividing a beacon interval for a second RAT into N time bins;
detecting, for each of the N time bins for each of M consecutive beacon intervals, transmissions of Wi-Fi preambles by access nodes of the second RAT or received energy; and
determining a number of beacons transmitted by access nodes of the second RAT by:
determining an average number of the detected Wi-Fi preambles for each of the N time bins over the M consecutive beacon intervals; and
determining the number of beacons transmitted by access nodes of the second RAT based on the average number of the detected Wi-Fi preambles for each of the N time bins over the M consecutive beacon intervals.

8. The method of claim 7 wherein the first RAT is Long Term Evolution, LTE, and the second RAT is Wi-Fi.

9. The method of claim 7 wherein detecting the Wi-Fi preambles comprises detecting the Wi-Fi preambles based on detection of a Legacy Short Training Field, L-STF, L-STF waveform.

10. The method of claim 7 wherein detecting, for each of the N time bins for each of the M consecutive beacon intervals, transmissions of the known, repetitive waveform by access nodes of the second RAT or received energy comprises performing matched filtering of a received signal based on a known, repetitive waveform, but sampled at a sampling rate used for the first RAT.

11. The method of claim 10 wherein performing matched filtering of the received signal comprises performing time domain matched filtering of the received signal with a filter impulse response that matches the known, repetitive waveform but sampled at the sampling rate used for the first RAT.

12. The method of claim 10 wherein performing matched filtering comprises performing frequency domain matched filtering of the received signal.

13. The method of claim 12 wherein performing frequency domain matched filtering of the received signal comprises performing frequency domain matched filtering of the received signal with a Fast Fourier Transform, FFT, of the known, repetitive waveform but with the sampling rate used for the first RAT and a FFT size used for the first RAT.

14. The method of claim 7 wherein detecting the transmissions of the Wi-Fi preambles by the access nodes of the second RAT or received energy comprises detecting received energy for each of the N time bins for each of the M consecutive beacon intervals.

15. The method of claim 14 wherein determining the number of beacons transmitted by access nodes of the second RAT comprises:

accumulating energy for each of the N time bins over the M consecutive beacon intervals; and determining the number of detected beacons transmitted by access nodes of the second RAT based on the accumulated energy for each of the N time bins over the M consecutive beacon intervals.

16. The method of claim 7 wherein detecting the transmissions of the Wi-Fi preambles by the access nodes of the second RAT or received energy comprises detecting a maximum energy at an output of a matched filter for each of the N time bins for each of the M consecutive beacon intervals, the matched filter performing matched filtering of a received signal based on the Wi-Fi preambles, but sampled at a sampling rate used for the first RAT.

17. The method of claim 16 wherein determining the number of beacons transmitted by the access nodes of the second RAT comprises:

accumulating the detected maximum energy for each of the N time bins over the M consecutive beacon intervals; and determining the number of detected beacons transmitted by the access nodes of the second RAT based on the accumulated detected maximum energy for each of the N time bins over the M consecutive beacon intervals.

18. The method of claim 7 wherein determining the number of beacons transmitted by the access nodes of the second RAT based on the results of the detecting comprises:

for each time bin of the N time bins, setting the number of preambles detected for the time bin to a number of preambles detected for the time bin that are correlated across the M consecutive beacon intervals to at least a predefined correlation threshold level.

19. The method of claim 18 wherein the number of preambles detected for the time bin that are correlated across the M consecutive beacon intervals to at least the predefined correlation threshold level is the number of preambles detected for the time bin that are correlated across the M consecutive beacon intervals to at least to the predefined threshold correlation level with respect to at least one of a group consisting of: start time, duration, and received signal strength.

20. A radio access node of a first Radio Access Technology, RAT, comprising:

a matched filter or energy detector operable to detect, for each of N time bins for each of M consecutive beacon intervals, transmissions of Wi-Fi preambles by access nodes of a second RAT or received energy; and a detector operable to determine a number of beacons transmitted by access nodes of the second RAT by being operable to:

determine an average number of detected Wi-Fi preambles for each of the N time bins over the M consecutive beacon intervals; and determine the number of beacons transmitted by the access nodes of the second RAT based on the average number of detected Wi-Fi preambles for each of the N time bins over the M consecutive beacon intervals.

21. The radio access node of claim 20 wherein the first RAT is Long Term Evolution, LTE, and the second RAT is Wi-Fi.

22. The radio access node of claim 20 wherein detecting the Wi-Fi preambles comprises detecting the Wi-Fi preambles based on detection of a Legacy Short Training Field, L-STF, L-STF waveform.

23. The radio access node of claim 20 wherein detecting, for each of the N time bins for each of the M consecutive beacon intervals, transmissions of a known, repetitive waveform by the access nodes of the second RAT or received energy comprises performing matched filtering of a received signal based on the known, repetitive waveform, but sampled at a sampling rate used for the first RAT.

24. The radio access node of claim 23 wherein performing matched filtering of the received signal comprises performing time domain matched filtering of the received signal with a filter impulse response that matches the known, repetitive waveform but sampled at the sampling rate used for the first RAT.

25. The radio access node of claim 23 wherein performing matched filtering comprises performing frequency domain matched filtering of the received signal.

26. The radio access node of claim 25 wherein performing frequency domain matched filtering of the received signal comprises performing frequency domain matched filtering of the received signal with a Fast Fourier Transform, FFT, of the known, repetitive waveform but with the sampling rate used for the first RAT and a FFT size used for the first RAT.

* * * * *